Figure 1:
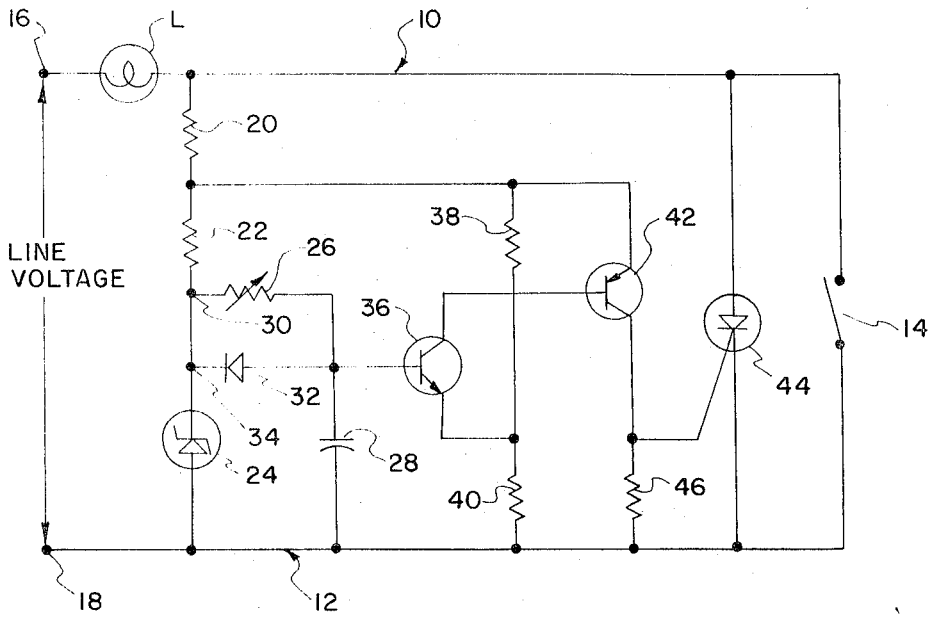
Figure 2A:
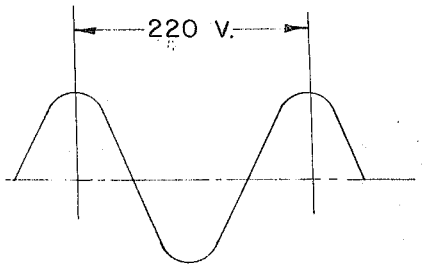
Figure 2B:
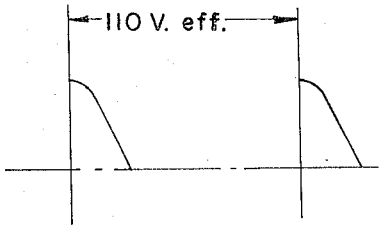

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 7, 1975

930 O.G. 116

T930,004
CONTROL CIRCUIT
Peter Schmidt, Ruit, Germany
Filed Jan. 28, 1974, Ser. No. 437,256
Claims priority, application Germany, Jan. 27, 1973, P 23 03 986.3
**Int. Cl. H02j *3/04***
U.S. Cl. 307—43
1 Sheet Drawing. 8 Pages Specification

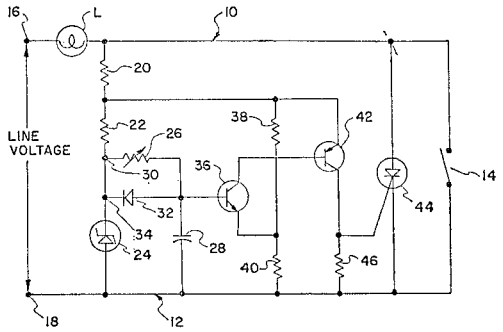

A phase control circuit for use with cinematographic apparatus includes a thyristor and a charging circuit for gating the thyristor on and off, to limit the power applied to a lamp so as to permit operation of the lamp from a 220 volt power source. The circuit includes a changeover switch which permits operation of the lamp from 110 volt power source.

CONTROL CIRCUIT

Filed Jan. 28, 1974